United States Patent
Chahine

(10) Patent No.: US 10,202,136 B2
(45) Date of Patent: Feb. 12, 2019

(54) LARGE PANEL HANDLING AND MOVING DEVICE

(71) Applicant: Gabi Chahine, North Hollywood, CA (US)

(72) Inventor: Gabi Chahine, North Hollywood, CA (US)

(*) Notice: Subject to any disclaimer, the term of this patent is extended or adjusted under 35 U.S.C. 154(b) by 0 days.

(21) Appl. No.: 15/979,205

(22) Filed: May 14, 2018

(65) Prior Publication Data

US 2018/0362061 A1  Dec. 20, 2018

Related U.S. Application Data

(60) Provisional application No. 62/509,646, filed on May 22, 2017.

(51) Int. Cl.
| | |
|---|---|
| *B62B 3/02* | (2006.01) |
| *B62B 3/10* | (2006.01) |
| *B62B 3/12* | (2006.01) |
| *B62B 3/00* | (2006.01) |

(52) U.S. Cl.
CPC .......... *B62B 3/108* (2013.01); *B62B 3/008* (2013.01); *B62B 3/009* (2013.01); *B62B 3/02* (2013.01); *B62B 3/12* (2013.01); *B62B 2206/06* (2013.01)

(58) Field of Classification Search
CPC ....... B62B 5/0083; B62B 3/108; B62B 1/268; B62B 2206/06; B62B 2301/08
See application file for complete search history.

(56) References Cited

U.S. PATENT DOCUMENTS

| | | | |
|---|---|---|---|
| 5,288,090 A * | 2/1994 | Bross | ............. B62B 1/26 269/905 |
| 5,460,469 A | 10/1995 | Young | |
| 6,027,128 A | 2/2000 | Stich et al. | |
| 6,241,447 B1 | 6/2001 | Echternacht | |
| 7,997,846 B2 | 8/2011 | Brunson | |
| 8,002,510 B2 | 8/2011 | Williams | |
| 8,424,884 B1 | 4/2013 | Nicol | |
| 8,662,486 B2 * | 3/2014 | Holder | ............ B23P 11/00 269/152 |
| 9,296,406 B2 | 3/2016 | Presley | |
| 2008/0093811 A1 * | 4/2008 | Williams | ............ B62B 1/268 280/35 |
| 2011/0052357 A1 | 3/2011 | Torrison | |
| 2018/0058122 A1 | 3/2018 | Lang | |

FOREIGN PATENT DOCUMENTS

CN  205916691  2/2017

* cited by examiner

*Primary Examiner* — Bryan A Evans

(74) *Attorney, Agent, or Firm* — Law Office of Scott C Harris, Inc

(57) ABSTRACT

A panel handling device, has a wheeled portion, having plural wheels at a bottom section thereof, and having a plurality of teeth along a section thereof, said teeth being at different heights relative to the wheeled portion, and a second handle portion, separable from the first wheeled portion, but selectively attachable there to, said handle portion having a handle at one end, and having a slot at the other end, into which slot a surface of the wheeled portion is received, and having a panel handling tray at said other end, the panel handling tray having a surface for holding a panel, and the second handle portion having a teeth holding portion, which holds a position between said first handle portion and said second handle portion by holding into the teeth.

10 Claims, 5 Drawing Sheets

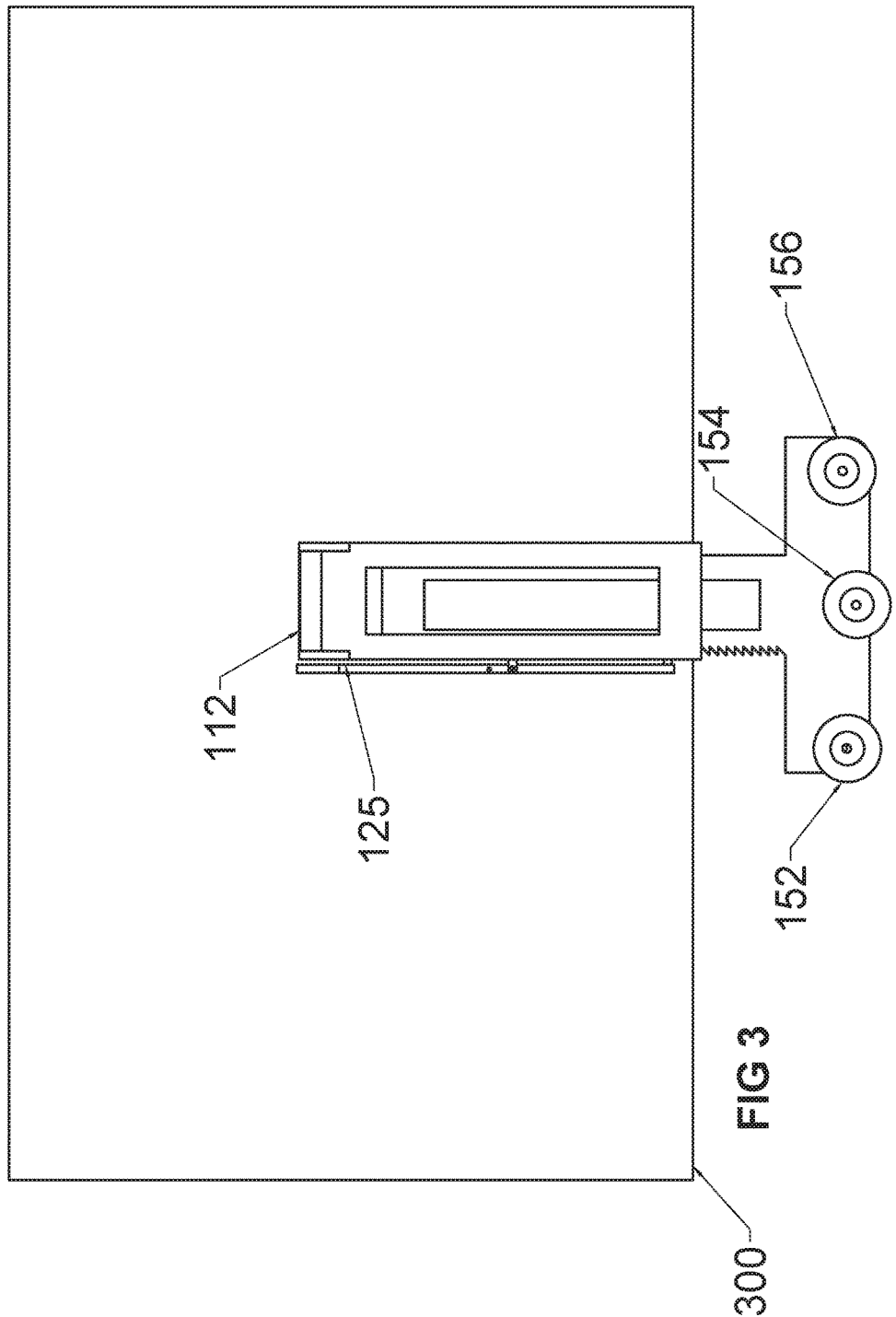

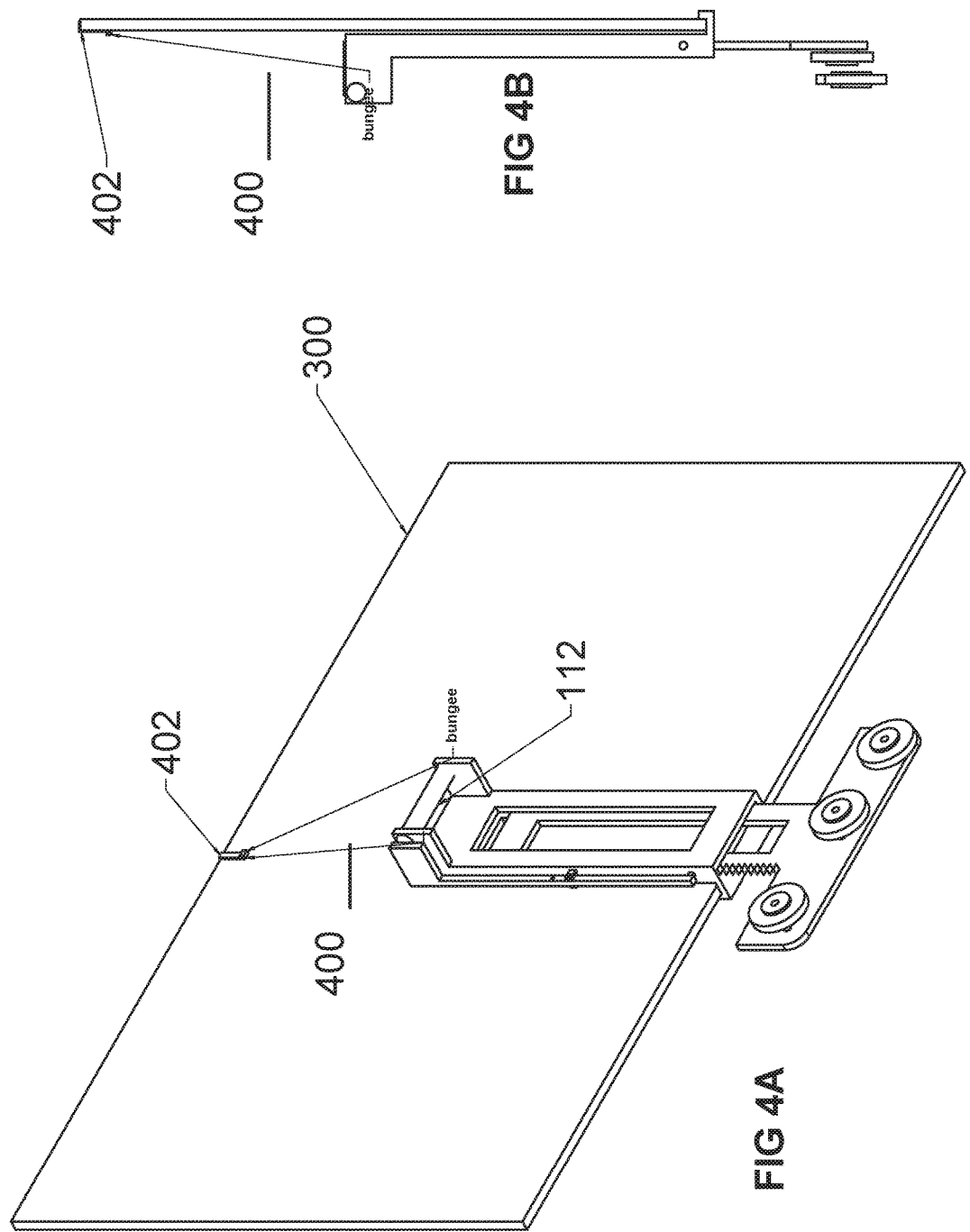

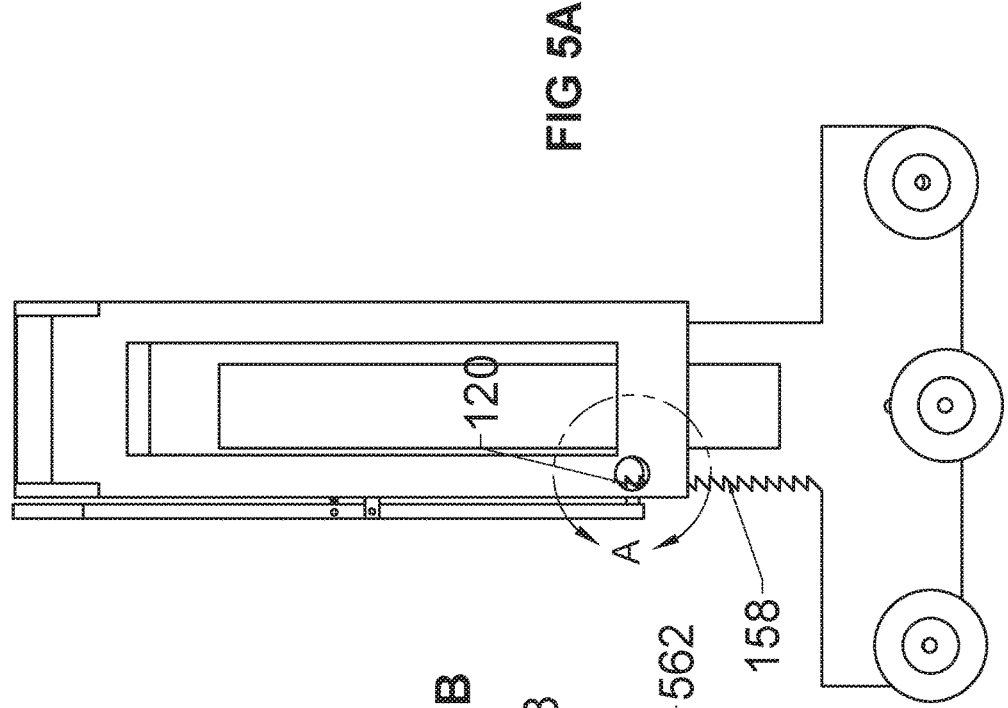
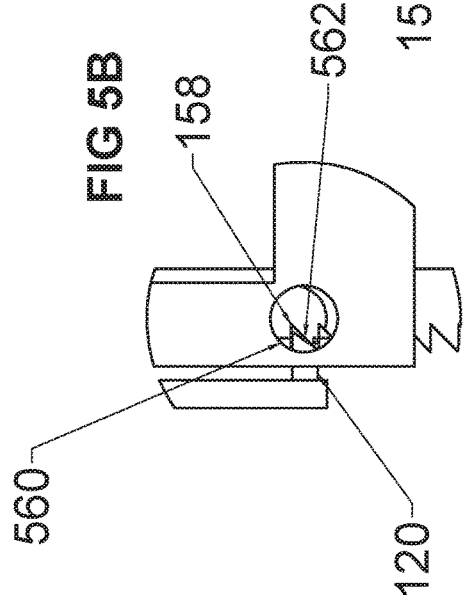

LARGE PANEL HANDLING AND MOVING DEVICE

This application claims priority from Provisional application No. 62/509,646, filed May 22, 2017; the entire contents of which are herewith incorporated by reference.

BACKGROUND

Moving of panels and construction work can cause injuries to the workers, because of the bulky nature of a large panel.

Arm extenders for panels are known, but still require that that a user carry a very heavy and bulky weight.

SUMMARY

The present application describes a tool for allowing carrying of a large panel or other bulky material, which is adjustable for size of the material, and for the location of the grip, and once the panel is included into the device, it can be rolled in a special way which allows the handling device to roll over obstacles such as unevenly placed floor parts.

BRIEF DESCRIPTION OF THE DRAWINGS

The different figures show different embodiments.

FIG. 3 shows a front on view of the panel handling device, showing the panel thereon;

FIGS. 4A-4B show how a bungee can be used to attach the panel to the handle of the device to hold the panel relative to the device; and FIGS. 5A-5B show further detail of the interaction between the pin on the handle part and the teeth on the wheeled part.

DETAILED DESCRIPTION

Figure 1:
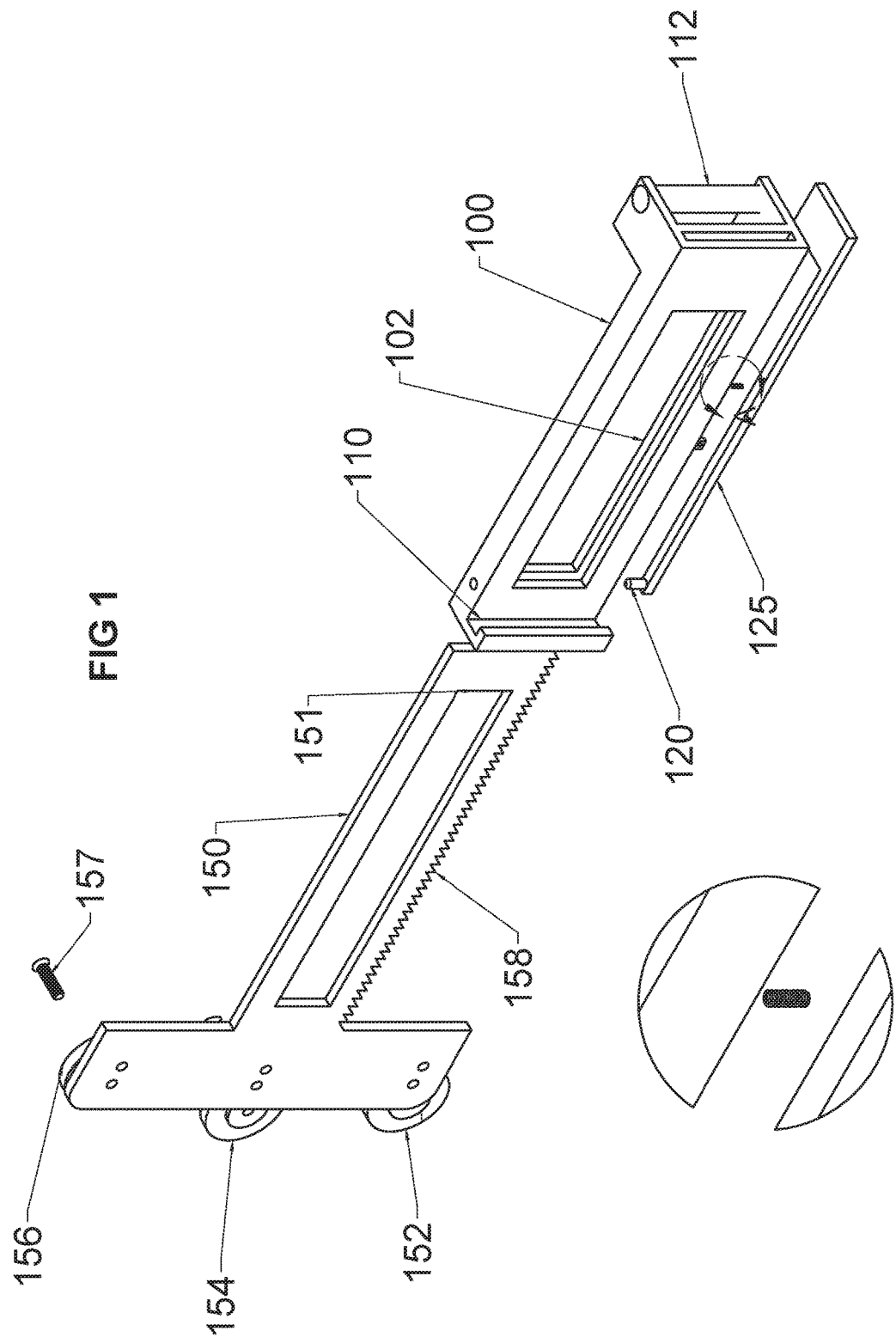
FIG. 1 shows a view of the two parts of the panel handling device.
Figure 2:
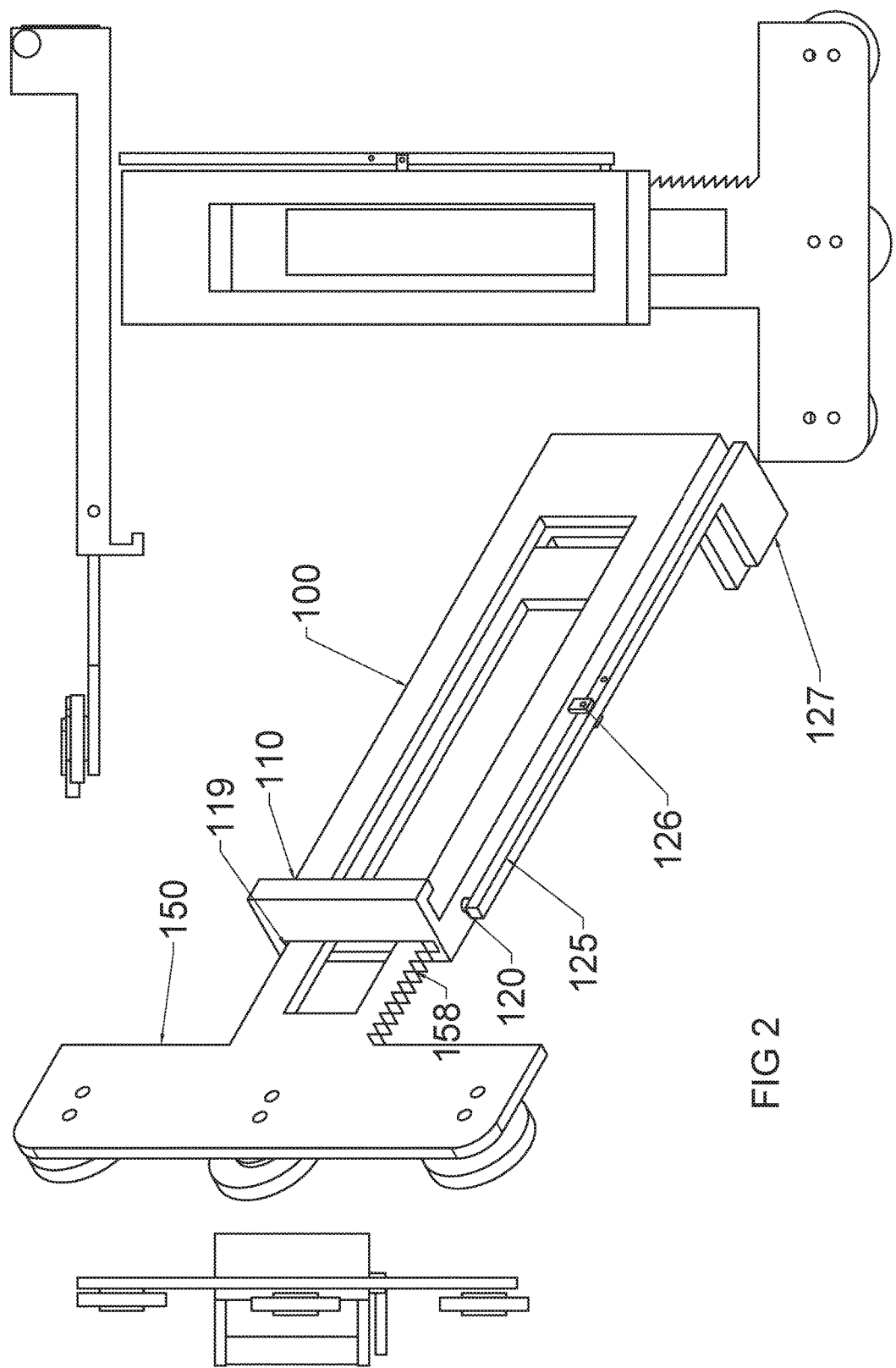
FIG. 2 shows a perspective view of the panel handling device.

An embodiment of the panel handling lift and cart is shown in FIGS. 1 and 2.

FIG. 1 shows the two connectable parts of the panel handling lift 99, including the handle part 100 which is releasably connected to the wheeling part 150. The wheeling part 150 fits into a slot 119 that is formed inside the handle part, and the wheeling part can move in that slot, unless constrained by the teeth and their interface as described herein.

The wheeling part 150 includes three wheels 152, 154, 156 at its bottom section. The wheels have uneven heights, that is at least the center wheel 157 is lower than the other two wheels. The wheels are attached by screws shown as 157 to the body of the wheeling part 150.

The wheeling part 150 also includes attachment ridges 158 which form a perforated edge that connects to a corresponding catch surface 120 on the handle part 100. The handle part 100 is movable relative to the wheeling part 150, but held in place by the surfaces of the catch surface 120 interfacing with the attachment ridges 158.

The perforated teeth of the attachment ridges 158 are cut at 450 angles, and the security pin 120 is also cut at 450. The security pin 120 is at the end of the rod 125 which is hinged on a spring hinge 126. A pressing mechanism 127 allows pressing down to hold the part 120 away from the teeth 158, thus allowing free movement between the handle 100 and the wheeling part 150.

The hinge 126 can be a spring hinge, that can automatically hold the pin 120 against the teeth 158, using the force from the spring hinge. When holding, the handle 100 and the wheeling part 150 are locked to one another. The pin 120 is separated from the teeth 158 when the pressing mechanism 127 is depressed towards the body of the handle part 100, overcoming the force of the spring hinge 126.

In operation, the handle part 150 can be placed at its lowermost position, the panel can be placed into the panel holding trough 110, and then the handle part 150 is lifted while depressing the pressing mechanism 127 (or in one embodiment, without depressing that mechanism. Once the handle part 150 is lifted to a sufficient height relative to the handle part 100, the pressing mechanism 127 is released, thus allowing the point 120 to hold between two of the teeth 158. This holds the handle part in position relative to the wheel part 150, with the panel lifted off the ground.

In another embodiment, the angle of the teeth enables the handle part 100 to be lifted, and the 45 angle of the teeth enables the point 120 to move upwards, however there is a flat surface against that point at the bottom most section of the area where the point intersects the teeth, thus preventing the handle part from moving downwards without depressing the depressing mechanism 127.

The handle part 100 is hollowed out on the inside forming a hollow cavity 102. Similarly, the wheeling part 150 has a hollowed out interior section 151. Both of these make the device lighter, but maintain the structural strength to hold a large and heavy panel. The handle part 100 also includes a panel holding trough 110 which is moved up and down as the handle part 100 moves up and down on the wheeling part 150, since the wheeling part is intended to press against the ground.

The handle part 100 also includes a handle 112 at its top side having grip surfaces, in a cylindrical or other shape to fit a user's hand.

The arm 125 includes the lever 120 which is spring-loaded into position to hold it against the teeth. The spring hinge provides tension on the security pin to keep it wedged between the teeth to prevent movement between the two parts.

FIG. 2 illustrates the two parts put together, with the handle part 100 attached to the wheeled part 150. The arm 125 includes the part 120, making contact with the teeth 158.

The user puts a large panel such as a piece of plywood or drywall on to the trough 110 as shown in FIG. 3 which shows a piece of plywood or drywall 300 held by the trough. The user can then hold the plywood on the trough by grasping the handle 112. The user lifts the panel to a desired height by pressing the handle 125 to disengage the catch 120 from the teeth 158 and lifting the panel. Then, the panel rests on the three wheels of the wheeled part 152, 154, 156.

The user can move the panel by using any two of the wheels, for example the user might move to the left in FIG. 3 by holding the panel on the wheels 152 154. However, when the an uneven spot in the ground is reached, such as a crack, the user can push the front wheel 152 by leaning on the back two wheels 154, 156, then place the front wheel 152 over the crack, and push the load forward again, to again lean on wheels 152, 154.

FIGS. 4A and 4B illustrates how a bungee 400 can be used for attaching the panel 300 to the handle 112. A hook 402 can hook over the top of the panel 300, to hold the panel to the front face of the device to prevent the panel from coming loose from the device, thus even further simplifying the moving operation.

The ability to separate the wheel part and handle part enables easier transport, and the wheeled part and handle part can be placed one over the other with the open cavities 102, 151 being aligned, and holding together those two parts for transportation. For example, this can use a bungee to hold the openings of the wheeled part and handle part together when they are not assembled, for easier transport.

FIGS. 5A and 5B show detailed close-up of the interaction between the security pin 120 and the teeth 158. The security pin 120 fits inside the teeth 158. There is a flat surface 560 at the top of the security pin 120, and a corresponding flat surface of the teeth 158 which prevents the downward movement of the handle part relative to the wheeled part since the flat surface of the teeth rest on the flat surface 560 of the security pin. However, there is also an angled side surface 562 of both the security pin 120 and the teeth 158 which enables the handle to be moved up without depressing the depression rod part 127.

Although only a few embodiments have been disclosed in detail above, other embodiments are possible and the inventors intend these to be encompassed within this specification. The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A panel handling device, comprising:
   a wheeled portion, having plural wheels at a bottom section thereof, and having a plurality of teeth along a section thereof, said teeth being at different heights relative to the wheeled portion;
   a second handle portion, separable from the first wheeled portion, but selectively attachable there to, said handle portion having a handle at one end, and having a slot at the other end, into which slot a surface of the wheeled portion is received, and having a panel handling tray at said other end, the panel handling tray having a surface for holding a panel,
   and the second handle portion having a teeth holding portion, which holds a position between said wheeled portion and said second handle portion by holding into the teeth.

2. The panel handling device as in claim 1, wherein the plural wheels are at different heights, thus enabling wheeling the panel handling device over uneven portions.

3. The panel handling device as in claim 2, wherein a center wheel is lower than the two outer wheels.

4. The panel handling device as in claim 1, wherein the teeth holding portion includes a point which fits between the two teeth, and holds the handle at a specified height relative to the wheeled portion by holding between the two teeth.

5. The panel handling device as in claim 4, wherein the teeth and the teeth holding portion are shaped to allow the handle to be moved upward relative to the wheeled portion, but not to allow the handle to be moved downward relative to the wheeled portion.

6. The panel handling device as in claim 4, further comprising a spring-loaded part that holds the point between the two teeth, and a pressing device, which is pressed to remove the spring-loaded device from between the two teeth.

7. The panel handling device as in claim 6, wherein the spring-loaded part is connected to the handle part.

8. The panel handling device as in claim 1, wherein the teeth are located along a surface that is substantially perpendicular to a bottom surface of the wheeled portion which holds the wheels.

9. The panel handling device as in claim 1, wherein the wheels are screwed into a bottom surface of the wheeled portion.

10. The panel handling device as in claim 1, wherein inside sections of both the wheeled portion and the handle portion are hollow forming a hollow cavity in that inside portion.

* * * * *